Figure 1:
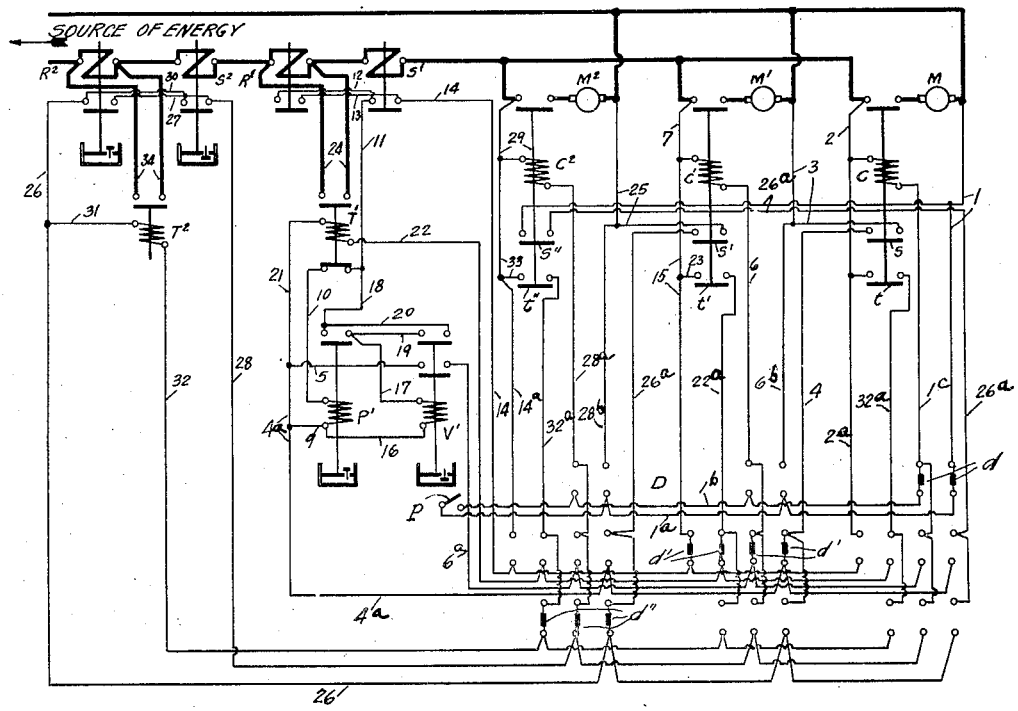

March 11, 1930.  W. DEANS ET AL  1,750,161
SYSTEM OF MOTOR CONTROL
Filed July 16, 1924   2 Sheets-Sheet 2

INVENTORS
BY
ATTORNEY

Patented Mar. 11, 1930

1,750,161

UNITED STATES PATENT OFFICE

WILLIAM DEANS, OF EAST ORANGE, NEW JERSEY, AND HENRY J. KAUFMAN, OF CHICAGO, ILLINOIS, ASSIGNORS TO SUNDH ELECTRIC COMPANY, OF NEWARK, NEW JERSEY, A CORPORATION OF NEW JERSEY

SYSTEM OF MOTOR CONTROL

Application filed July 16, 1924. Serial No. 726,247.

The present invention relates to a system of motor control, for either direct or alternating currents, and, more particularly, to the control of the starting and stopping of the motors in a plural motor system, in which a single motor is employed to carry the entire load on the system up to a given limit, usually the full rated capacity of the motor, and for heavier loads an additional motor (or motors) is stepped in to assist the first in carrying the same and is then stepped out when the load again drops.

In general, the load on an electrical motor, industrially applied, is determined by its own internal losses and by the conditions which the driven device, or devices must meet, and this load is reflected in the current which the motor draws from the line. A certain amount of current is consumed, and load imposed, in overcoming the internal losses of the motor itself and in taking up the losses in the driven device; the remainder of the current taken by and of the load on a motor system, and consequently the total current and load, will fluctuate according to the output of the system, that is to say, according to the outside or useful work which it is doing.

A motor operates at its highest efficiency when it is delivering its full rated output of work. In the great majority of motor applications the fluctuations in the load are so small that a single motor may be economically employed for the operation of the system. There are many cases, however, where the fluctuations in load are very considerable; so much so that if a single motor, of a size sufficient to take care of peak loads, were used it would operate at a small percentage only of its rated capacity and so at a low efficiency during all periods of light loads. Hence, in a system in which the load may vary over wide limits it is more economical to employ two or more smaller motors, which may be connected all to the same or each to a different driven device, to together operate the system under heavy loads, the number of the motors to be run at any given time being governed by the demand thereon.

The proper starting and stopping of the motors may of course be effected manually, by an attendant, or may be effected automatically.

The general object of our invention is to provide a simple and efficient automatic control whereby, in a plural motor system, the additional motor or motors will be stepped in when and as required and will be stepped out as soon as the demand therefor ceases.

An automatic system necessarily requires an automatic starter for each motor, except perhaps the first, and some means, responsive to load or to current, for controlling the pilot circuit which actuates the starter of the second and of each additional motor.

While the first motor, or motor which is to be used singly to operate the system under light loads, may be started and stopped manually, we prefer to provide it also with an automatic starter, any suitable type of motor starter may be used for the purpose, preferably, however, a type in which the motor is started through the usual starting resistance, or in the case of certain alternating current motors through transformer windings or their equivalents. Then, by inserting a suitable switch in the nature of a transfer switch in the pilot circuits, either one of two, or any one of more than two, motors may be used as the single motor to operate the system under light loads.

For stepping in and out the second, or any additional, motor we preferably provide a control responsive to motor current which is adapted to start such motor under a current of a certain predetermined value and to stop it under a current of a higher value, and this constitutes an important feature of our invention. The ordinary series relay, which will be held in position by a current of somewhat less value than that at which it is set to pick up, is not efficient for the purpose. If such relay is set to pick up and so start the second motor at a current value equal to that taken by the first motor when it reaches its full load, it will not drop out to stop the motor until the total current taken by both motors, which as stated includes the amount required to overcome the internal resistance of the second motor, has fallen to a value below that at which it picked up. The single motor will then be operating not at full capacity but at capacity less the losses in the motor cut out. If, on the other hand, the relay is set to pick up at a lower current value, then the additional motor will be stepped in under loads which could have been more efficiently carried by a single motor. In either case, the system will be operated by two motors through a range of load fluctuations equal to the load represented by the internal losses of the second motor when it could have been operated more economically by one of them. We have obviated this loss in efficiency, in our new system, by employing for the control of each additional motor two series relays one of which is or may be set to pick up at a current value representing the full load of the motor or motors then running and the other to drop out at a current value enough higher to compensate for the amount of current required to overcome the losses in the additional motor and by so operatively connecting the two relays that, after the first has acted to start the additional motor, the control of the motor will thereupon be transferred to the second relay.

Furthermore, a motor can carry an overload for a short time without injury, and, on the other hand, in the case of an excess of motor capacity which is temporary only, it is not advisable to step out one of the motors already running and then to immediately step it in again. Hence, for a maximum of efficiency, the system should include means for bridging temporary peaks and valleys in the load, respectively, without stepping in an extra motor or stepping out one already running. The specific means we prefer to employ for this purpose include a pair of shunt relays in connection with each additional motor, one picking up at a predetermined time interval after its coil has been energized but dropping out instantly on the de-energizing of the coil and the other picking up instantly but dropping out at a predetermined time interval after its coil has been de-energized, which are so operatively related to the pilot circuit of the motor as to jointly control the action of the series relay, or relays thereon. The same end may, however, be attained, where the starting and stopping of the additional motor is under the control of two series relays, by associating suitable means—a dash-pot, for example,—with each of these relays.

Our new system therefore preferably comprises, in combination with the plurality of motors, an automatic starter for each motor, means for controlling the pilot circuit of each motor, except the first, which are actuated by motor current of predetermined value to close such pilot circuit and start the motor and by motor current of a higher value to open the pilot circuit and stop the motor, and means for temporarily delaying both the closing and opening action of said control means to bridge the temporary peaks and valleys in a rapidly fluctuating load.

The invention is diagrammatically shown, by way of illustration and not of limitation, in the accompanying drawings, in which—

Figure 2:
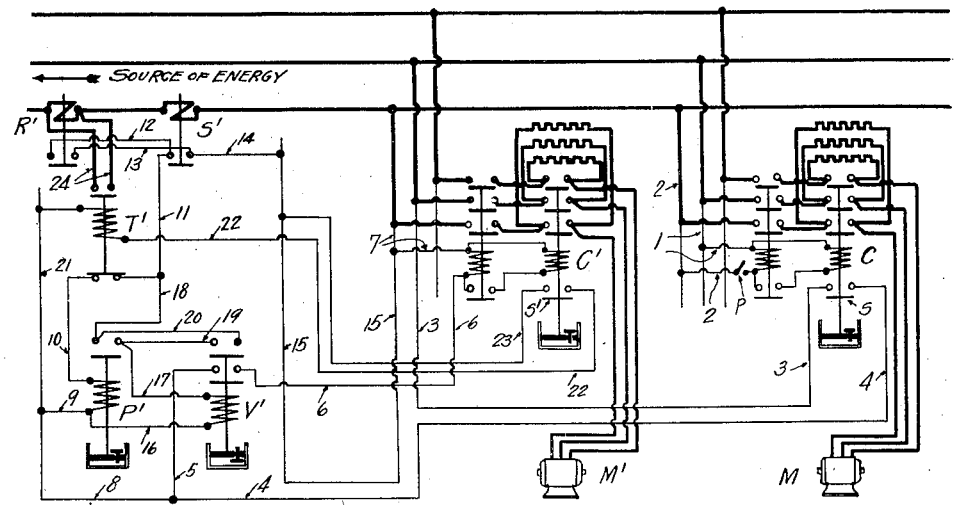
Figure 3:
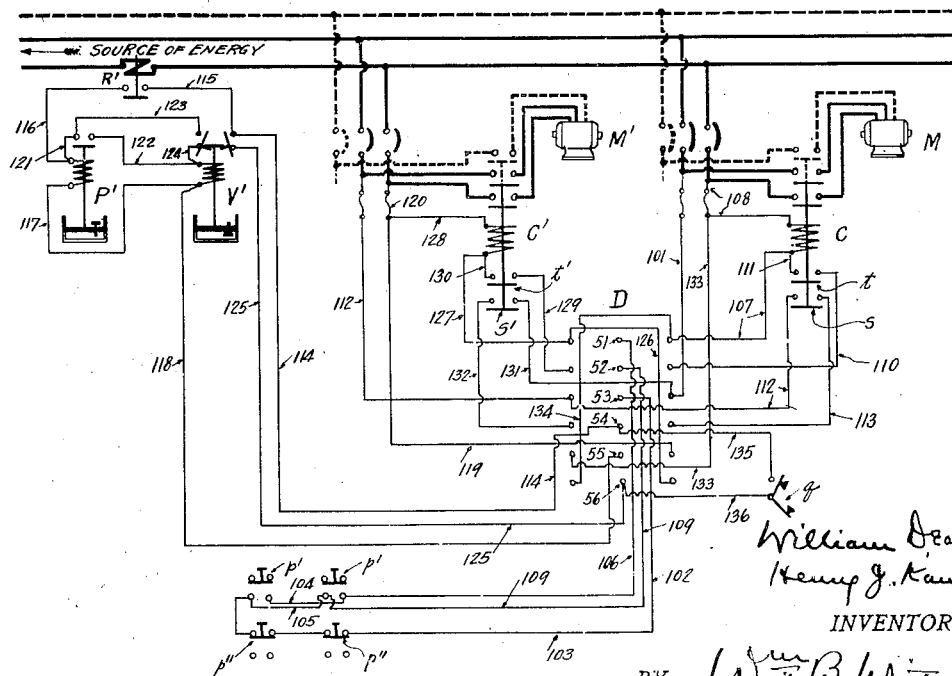

Figure 1 is a view showing a plural motor system, for direct or single-phase alternating currents, embodying certain of the features of our invention; Fig. 2 illustrates an embodiment of our invention in a two-motor system for polyphase alternating currents; Fig. 3 shows a two-motor system adapted either for direct or single-phase alternating currents, or, with the additions indicated by dotted lines, for polyphase alternating currents, embodying a transfer switch and a single series relay control; and Fig. 4 is a diagram showing the performance curves of one, two, and three motors in a two- or three-motor system, the vertical component of each curve representing the amount of current consumed and its horizontal component the output of the system or the useful work being performed.

The same reference characters indicate substantially like parts throughout the several figures of the drawings.

Referring first to the three-motor system illustrated in Fig. 1, M M' M² indicate the motors, C C' C² indicate the automatic starters or controllers associated therewith respectively, and D indicates a rotary interchange or transfer switch in the pilot circuits of the motor starters. The starters, which are here represented merely as single contactors controling each the circuit of a motor, are preferably, as stated, of the well-known type adapted to open and close these circuits through starting resistance. The interchange switch, whereby any one of the three motors can be used as the single motor to operate the system under light loads, is here shown so positioned that the motor M will be first started and will operate the system so long as the load thereon does not exceed the capacity of the motor.

As thus set, the pilot circuit of the starter of motor M includes the wires 1 1ᵃ 1ᵇ 1ᶜ, brushes $d$ of switch D, actuating coil of starter C, and wire 2, and is controlled by the switch P, here illustrated as a simple hand switch. The wires 3 to 7 inclusive and two brushes $d'$ of switch D provide the pilot circuit for the starter of motor M', which circuit is controlled by the auxiliary switch $s$ of starter C, preferably so associated with the starter as to close its contacts at about the time the last section of resistance is cut out of the circuit of motor M, and by the series relays R' S', shunt relays P' V', and transfer relay T' through their circuit connections 9 to 23 inclusive and the two remaining brushes $d'$ of switch D. And the wires 25 to 29 inclusive and brushes $d''$ of switch D provide the pilot circuit of the starter of motor $M^2$, and this circuit is controlled by the auxiliary switch $s'$ of starter C' and by the series relays $R^2$ and $S^2$ and transfer relay $T^2$ through their circuit connections 30 to 33 inclusive and the third brush $d''$ of switch D.

The operation of the system as described is as follows: On closing the switch P current flows through the coil of starter C which thereupon closes the circuit of the motor M, and, as the motor speeds up, the auxiliary switch $s$ closes and bridges at this point the pilot circuit of the starter of motor M'. The motor M being now operating the system, whenever the current taken thereby rises to the value for which series relay R' is set, this relay picks up and, closing its contacts, establishes a circuit, from wire 4 to wire 7, over wires $4^a$ 9, coil of relay P', wire 10, lower contacts of relay T', wires 11 12, contacts of relay R', and wires 13 14, brush $d'$, and wire 15. The relay P', being now energized, will close its contacts after an interval determined by the retarding action of its dashpot, provided the contacts of relay R' remain closed for the period required, and thereby establish a further circuit, from wire 9 to wire 11, over wire 16, coil of relay V', wire 17, contacts of relay P', and wire 18, thus causing the actuation of relay V', which instantly responds and at its lower contacts connects wire 5 with wire $6^a$ and closes the pilot circuit of the starter of motor M', and at the same time establishes for itself a holding circuit, from wire 17 to wire 18, over wires 19 20. As motor M' starts, the first inrush of additional current actuates the series relay S', which is set to pick up at a higher current value than that to which relay R' responded, thus connecting wire 11 directly with wire 14 and short-circuiting the contacts of relay R'. Finally, the auxiliary switch $t'$ having closed as starter C' brings the motor M' up to speed, a circuit is established, between wire 9 and wire 15, over wires $4^a$ 21, coil of relay T', and wires 22 $22^a$ 23, thus causing the actuation of this relay, which opens its lower contacts and breaks the circuit through the coil of relay P', which drops instantly, and at its upper contacts establishes a short circuit 24 around the coil of relay R', thus putting it out of commission and leaving relay S' in control of motor M'. The two motors M and M', which are now running, will continue jointly to operate the system as long as the current consumed is above the amount required to hold up relay S' and below the amount required to actuate the relay $R^2$. In case the load becomes so reduced that the current falls below the value indicated therefor, relay S' will drop out and by breaking the connection between wires 11 and 14 will open the circuit through the coil of relay V', which, after an interval determined by the action of its dashpot, will drop and open the pilot circuit of the starter of motor M', if in the meantime an increase in load has not caused relay S' to again pick up and close its contacts. On the other hand, should the load sufficiently increase, and so remain during the interval required by the action of its dashpot, relay $R^2$ will pick up and close the pilot circuit of the starter of motor $M^2$, comprising the coil of starter $C^2$ and wires 25 to 29 inclusive, and start the motor. The inrush of additional current thereto will cause relay $S^2$ to instantly close its contacts and connect wire 26 with wire 28 through wire 30, around the contacts of relay $R^2$. Then, as motor $M^2$ speeds up the auxiliary contacts $t''$ of starter $C^2$ will be closed and established by wires 31 32 brush $d''$ of switch D and wires $32^a$ 33 a circuit through the coil of relay $T^2$, which thereupon will close the short-circuit 34 around relay $R^2$, causing the latter to instantly drop and leaving relay $S^2$ in control. As soon as the load drops so that the current taken falls sufficiently therefor, relay $S^2$ will be released and, if the load does not presently rise, will after the interval required for the action of its dashpot open its contacts, break the pilot circuit, and stop the motor $M^2$.

The series relays R' and S' are preferably so constructed and adjusted as to pick up at the point $a$ on curve $x$ and the point $e$ on curve $y$, respectively, Fig. 4. Accordingly, the relay R' will pick up and close its contacts when motor M is drawing from the line a current represented by the vertical distance $b\ a$ and is doing work, represented by the horizontal distance $o\ b$, to its full rated capacity. When motor M' starts the current taken by the two motors immediately jumps to the point $e$ on curve $y$, the current represented by the distance from $a$ to $e$ being that taken to overcome the internal resistance of the second motor, and on this inrush of additional current relay S' picks up and is ready to assume control of the pilot circuit of motor M' on the short-circuiting of relay R'. The result is that, whenever the load on the two motors drops so that the current drawn from the line falls slightly below the point $e$, say to the point $f$, on curve $y$, relay S' will drop and thereby step out motor M', leaving motor M working at nearly full capacity, represented by the horizontal distance $o\ g$; whereas, had relay R' been used to control the stepping out as well as the stepping in of motor M', this motor would have continued to run until the current taken by both motors had fallen to the point c on curve y, representing a current value d c slightly below the value b a at which this relay picked up, thereby leaving the motor A working at only the fraction of its capacity represented by the distance o d. In other words, controlled by the two series relays as described, the second motor is stepped out as soon as the demands on the system fall to a point only slightly below the full capacity of the single motor while, with a single series relay control, the two motors would have continued to do the work represented by the distance g d which could have been more efficiently done by one of them.

Similarly, the series relay R², which is so adjusted as to be actuated with a current i h (Fig. 4), will pick up and close the pilot circuit of the starter of motor M² when the load on the system reaches the point h, on the curve y, and remains thereat or further increases during the interval required for the action of its dashpot. When motor M² starts the current taken by the three motors immediately jumps from the point h, on curve y, to point j, on curve z, and on this inrush of additional current relay S², set to respond to the current i j, instantly picks up and is ready to assume control of the pilot circuit of the starter of motor M² on the short-circuiting of relay R². As soon as the load drops so that the current taken falls somewhat below the value i j, say to the value of l k, relay S² will be released and, if the load does not presently rise, will after the interval required for the action of its dashpot open its contacts, break the pilot circuit and stop the motor M².

It is obvious that the pilot circuit of the starter of motor M² could be controlled by relays and circuit connections similar in all respects to those used for the control of the pilot circuit of the starter of motor M', but as here shown, in illustration of the hereinabove mentioned alternative means for bridging temporary peaks and valleys in the load on the system, the two shunt relays and their dashpots have been omitted and dashpots have been attached directly to the stems of the two series relays, that associated with relay R² being arranged to delay the closing of its contacts when the current through its coil is sufficient to cause it to pick up and that associated with relay S², oppositely arranged, being adapted to delay the opening of its contacts after the current through its coil has fallen to a value permitting it to drop.

If now it is desired to operate the system with the motor M' instead of motor M, the switch D will be turned to shift its brushes from the position shown to their next position, where brushes d will connect wires 1ᵃ with 6ᵇ and 1ᵇ with 6, brushes d' will connect wires 4ᵃ with 26ᵃ, 6ᵃ with 28ᵃ, 22 with 32ᵃ, and 14 with 14ᵃ, and brushes d'' will connect wires 26 with 26ᵃ, 28 with 1ᶜ and 32 with 32ᵃ. The pilot circuits of the several motor starters will then be constituted as follows: For the starter of motor M', wires 3 6ᵇ 1ᵃ 1ᵇ 6 and 7, controlled by the hand switch P; for the starter of motor M², wires 25 26ᵃ 4ᵃ 5 6ᵃ 28ᵃ and 29, controlled by auxiliary switch s' and by the series relays R' S', shunt relays P' V', and transfer relay T' through their circuit connections; and for the starter of motor M, wires 1 26ᵃ 26 30 28 1ᶜ and 2, controlled by auxiliary switch s'' and by the series relays R² S² and transfer relay T² through their circuit connections. And in operation, on closing the hand switch P, motor M' will be started and will operate the system until, on the requisite increases in the load, motor M² will first and motor M will later be cut in, and these two motors will be cut out in reverse order as the load falls.

Again, if the switch D is shifted to its third position, the brushes d will connect wires 1ᵃ with 28ᵇ and 1ᵇ with 28ᵃ, brushes d' will connect wires 4ᵃ with 26ᵃ, 6ᵃ with 1ᶜ, 22 with 32ᵃ, and 14 with 2ᵃ, and brushes d'' will connect wires 26 with 4, 28 with 6, and 32 with 22ᵃ, establishing pilot circuits for the motor starters as follows: For the starter of motor M², wires 25 28ᵇ 1ᵃ 1ᵇ 28ᵃ and 29, controlled by the hand switch P; for the starter of motor M, wires 1 26ᵃ 4ᵃ 5 6ᵃ 1ᶜ and 2, controlled by auxiliary switch s'' and by the series relays R' S', shunt relays P' V', and transfer relay T' through their circuit connections; and for the starter of motor M', wires 3 4 26 30 28 6 and 7, controlled by auxiliary switch s and by the series relays R² S² and transfer relay T² through their circuit connections. Accordingly, the motor M² will be started on the closing of the hand switch P and will operate the system until the load exceeds its capacity and then motors M and M' will be cut in in order, and will be cut out in reverse order when the load falls.

In the two-motor three-wire system for polyphase alternating currents illustrated in Fig. 2 the automatic starters C and C', associated with the two motors M and M', respectively, are of any suitable type. Each is here shown as comprising two contactor switches the first of which has its coil in the pilot circuit of the motor and acts when energized to close the motor circuit through a resistance in each of its three wires and at the same time to close a circuit through the coil of the second contactor, which thereupon responds and cuts out the resistances in the motor circuit. The motor M is started and stopped by the manipulation of the hand-switch p to establish and break connection between wires 1 and 2, which provide its pilot circuit; and the stepping in and stepping out of motor M' is effected in substantially the same way, by relays and circuit connections in all respects substantially the same, as is the corresponding motor M' in the system illustrated in Fig. 1 and hereinabove described, and with the same result.

The two-motor system illustrated in Fig. 3, adapted either for direct or single phase alternating currents or, with the third wire and additional starter-switches shown in dotted lines, for polyphase alternating currents, is shown as equipped with a transfer switch, whereby either one of the two motors may be used as the single motor to run the system, and the stepping in and out of the second motor as controlled by a single series relay through means adapted to bridge temporary peaks and valleys in the load. The automatic starters C and C' respectively associated with the two motors are represented, as in Fig. 1, as single contactors with main and auxiliary switches, the former controlling the motor circuits and the latter the pilot circuits. The transfer switch is indicated at D, while the series relay R' and the shunt relays P' and V' are similar to the corresponding relays in the systems previously described. Push-button switches $p'$ $p'$ and $p''$ $p''$, conveniently located, serve for the remote control of the pilot circuits of the motors, while the hand-switch $q$ provides a means whereby the additional motor can be stepped in and out at any time without the actuation of the series relay. The wires 101 to 136 inclusive form the pilot and other control circuits.

The operation of this modified system is as follows: Assuming that it is desired to operate motor M as the single motor the transfer switch D is thrown over so that its movable contacts 51 to 56 inclusive engage the corresponding fixed contacts to the right thereof. The closing of either of the switches $p'$ $p'$ will establish a circuit through the coil of starter C over wires 101 to 103, 104 or 105, and 106 to 108. The starter C, responding, closes its main contacts and starts the motor; and, as the motor speeds up, the auxiliary switches $s$ and $t$ close their contacts, switch $t$ establishing a holding circuit for the starter between wires 105 and 108 by wires 109 to 111, and switch $s$ closing at this point a circuit, by wires 112 to 120 inclusive, which includes the coil of the shunt relay P' and the contacts of the series relay R', thereby placing the series relay in control of motor M'. Whenever therefore relay R', responsive say to a current representing the full load on motor M, picks up and closes its contacts relay P' is energized and, subject to the retarding action of its dash-pot, will close its contacts thereby establishing a circuit from wire 116 to wire 118 by wires 121 122 and the coil of relay V'. The latter relay, immediately responding, through its left-hand contacts establishes a holding circuit for itself by wires 123 124 and through its right-hand contacts closes a circuit from wire 114 to wire 120, by wires 125 to 128 inclusive, through the coil of starter C', thus short-circuiting relay P', which immediately drops out, and through the starter C' effecting the stepping in of motor M'. The motor M', thus started, continues to run until the current taken by the two motors falls to a value insufficient to hold up relay R'; whereupon relay V' being deenergized will, unless relay R' picks up before the opening of its contacts under the retarding action of the dash-pot, in turn break the circuit through the coil of starter C' and so stop motor M'. In case it is desired to run motor M' as the single motor the movable contacts of the transfer switch D are thrown to the left thereby connecting wires 106 109 102 114 118 125 with wires 127 129 112 132 133 134, respectively. The operation is substantially as before described, motor M' being started by closing one of the push-button switches and motor M being stepped in and out automatically under the control of the series relay, and need not be described in detail. By means of switch $q$ the attendant can, if desired, connect wire 135 with wire 136 and thereby, whichever motor is running, step in the additional motor, these wires then serving to establish a circuit either from wire 113 to wire 126 and thence through the coil of starter C' or from wire 132 to wire 134 and thence by wire 107 through the coil of starter C, as the case may be. The single series relay control here illustrated does not, of course, have the efficiency obtained by the double series relay control as hereinabove explained, and hence is not so desirable.

It is to be understood that in the practice of our invention certain of its features may be used without the others or may be differently combined, and that in all cases mechanical or electrical equivalents may be substituted for the parts specifically shown and described, without departing from the spirit or sacrificing the advantages thereof.

What we claim as new, and desire to secure by Letters Patent, is:—

1. In a motor system, the combination of a plurality of motors, circuits therefor arranged in parallel one with another, and a control system which comprises means for controlling the circuit of one of said motors and, for the control of the other motor or motors, means responsive to the motor current in the system and operative on a rise in the load thereon to a predetermined value to effect the closing and on a fall in the load thereon to a somewhat higher predetermined value to effect the opening of the circuit of an additional motor.

2. In a motor control system, the combination, with a plurality of motors and their circuits, of means for controlling the circuits of one of said motors and, for the control of the other motor or motors, means responsive to the motor current in the system and operative on a sustained rise thereof to a predetermined value approximately that of the full rated value of the motor or motors then running to cut in and on a sustained fall thereof to a somewhat higher predetermined value to cut out an additional motor.

3. A motor system comprising, in combination, a plurality of motors and their circuits, means for controlling the circuit of one of said motors, electromagnetic means responsive to the motor current in the system for controlling the circuit of each additional motor, and electromagnetic means for delaying the action of said control means to bridge temporary peaks and dips in the load on the system.

4. A motor system comprising, in combination, a plurality of motors and their circuits, a transfer switch, means operative through said switch for controlling the circuit of any one of said motors, electromagnetic means responsive to the motor current in the system operative through said switch for controlling the circuit of each of the other motors, and means for temporarily delaying the operation of said current responsive control means.

5. A motor system comprising, in combination, a plurality of motors and their circuits, an electromagnetically-actuated starter associated with each motor for controlling the circuit thereof, a transfer switch, means operative through said switch for controlling the actuating switch of the starter of any one of said motors, means responsive to the motor current in the system and operative through said switch for controlling the actuating circuit of the starter of each additional motor, and means for retarding the operation of said current-responsive control means to bridge temporary peaks and dips in the load on the system.

6. A motor system comprising, in combination, two motors and their circuits, an electromagnetically-actuated starter associated with each motor for controlling the circuit thereof, a transfer switch, means operative through said switch for controlling the actuating circuit of the starter of either one or the other of the motors, means responsive to the motor current in the system and operative through said switch for controlling the actuating circuit of the starter of the other motor, and means for temporarily retarding the operation of said current-responsive means.

7. A motor system comprising, in combination, a plurality of motors and their circuits, means for controlling the circuit of one of said motors, and associated with each additional motor control means which are responsive to current in a circuit common to the circuits of all the motors in the system and are actuated by a current of predetermined value and are released by a current of somewhat higher value.

8. A motor system comprising, in combination, two motors and their circuits and an electromagnetically-actuated control system which includes means responsive to the current in the motor system and operative when the load on the system rises to approximately the full rated capacity of one motor to step in the second motor and to step out said motor when the load on the system again falls to approximately the full rated capacity of the first motor plus the load due to the internal resistance of the second motor.

9. A motor system comprising, in combination, a plurality of motors and their circuits, an electromagnetically-actuated starter associated with each motor and controlling the circuit thereof, means for controlling the actuating circuit of the starter of one motor, and means for controlling the actuating circuit of the starter of each additional motor which means are actuated by motor current in the system approximating the full load current of the motor or motors then running and are released by such current plus approximately the additional current required to overcome the internal losses of said additional motor.

10. In a plural motor system, an automatic control for at least one of the motors which comprises two relays responsive to the motor current in the system and set to pick up at different current values and operative circuit connections whereby the starting of the motor will be under the control of the relay picking up at the lower current value and its further control will thereupon be transferred to the other relay.

11. A motor system comprising, in combination, two motors and their circuits, an electromagnetically-actuated starter associated with each motor and controlling the circuit thereof, means for controlling the actuating circuit of the starter of one motor, and means for controlling the actuating circuit of the starter of the second motor which includes two series relays responsive to current in a circuit common to the circuits of both motors and operative one by a rise of the current above a predetermined value to effect the closing, and the other operative on the fall of the current below a predetermined but higher value to effect the opening, of the actuating circuit of the starter of the second motor.

12. A motor system comprising, in combination, two motors and their circuits, means for controlling the circuit of one of said motors, and a control system for the circuit of the second motor which includes two series relays responsive to current in a circuit common to the circuits of both motors and adapted one to pick up on the current taken by the first motor when running at approximately full load and the other to pick up on the current taken by the first motor when running at approximately full load plus the current approximately required to overcome the internal losses of the second motor, means operative on the actuation of the first relay to effect the closing of the circuit of the second motor, means operative on the starting of the second motor to short-circuit the coil of the first relay and leave the second relay in control, and means operative on the release of the second relay to open the circuit of the second motor.

13. A motor system comprising, in combination, a plurality of motors and their circuits, means for controlling the circuit of one of said motors, and associated with each of the other motors electromagnetic means for controlling the circuit thereof which are actuated by current in a circuit common to the circuits of all the motors in the system of predetermined value and are released by motor current in the system of a somewhat higher value, and means for retarding the operative effect both of the actuation and of the release of said electromagnetic control means.

14. A motor system comprising, in combination, two motors and their circuits and a control system which includes means responsive to motor current and operative by the current consumed by one motor after running approximately at full load for a predetermined time interval to step in the second motor and to step out the second motor when the total motor current falls and remains for a predetermined time interval slightly below such actuating current plus approximately the current required to overcome the internal losses of said second motor.

15. In a plural motor system, an automatic control for at least one of its motors which comprises two series relays responsive to the motor current in the system and one of which is set to pick up at a lower current value than the other, two timing relays provided with means for retarding, one the closing of its contacts and the other the opening of its contacts, and operative circuit connections whereby the first series relay acting through the first and second timing relays controls the closing of the motor circuit and the second series relay acting through the second timing relay controls the opening of the motor circuit.

16. A motor system comprising, in combination, two motors and their circuits, means for controlling the circuit of one of said motors, and a control system for the circuit of the second motor which includes two series relays responsive to current in a circuit common to the circuits of both motors and adapted one to pick up on the current taken by the first motor when running at approximately full load and the other to pick up on such current augmented by the current approximately required to overcome the internal losses of the second motor, means operative on the actuation of the first relay to effect after a time interval the closing of the circuit of the second motor and then to short-circuit the coil of the first relay and leave the second relay in control, and means operative on the release of the second relay to open after a time interval the circuit of the second motor.

17. In a plural motor system, the combination, with two motors and their circuits connected in parallel one with another, of electromagnetically-actuated means adapted to control the circuit of either one or the other of said motors as desired and means actuated by current of predetermined value in the circuit of one of said motors for effecting the closure of the circuit of the other motor and released by a current of higher value in the circuits of the two motors to thereby effect the opening of the circuit of such other motor.

18. A motor system comprising, in combination, two motors and their circuits and an electromagnetically-actuated control system which includes a transfer switch, means operative through said switch for controlling the circuit of either one or the other of the motors, two series relays responsive to current in a circuit common to the circuits of both motors and actuated one by a current approximating in amount that taken by one motor when running at full load and the other by such current plus approximately the amount required to overcome the internal losses of the second motor, means operative on the actuation of the first series relay through said switch to close the circuit of the second motor, means operative on the starting of the second motor to short-circuit the coil of the first relay and to place the second relay in control, and means operative on the release of the second relay through said switch to open the circuit of the second motor.

19. In a plural motor system, the combination, with a plurality of motors having their circuits connected together in parallel, of an electromagnetically-actuated control system comprising means for selectively starting one or another of the motors and means responsive to current in the common motor circuit for stepping in each additional motor whenever the current in said circuit reaches a value approximating the full-rated load of the motor or motors then running and for reversely stepping out each additional motor when the current in said circuit falls to a value somewhat above that at which it was stepped in.

20. In a plural motor system, the combination, with a plurality of motors having their circuits connected together in parallel, of an electromagnetically actuated control system comprising means for selectively starting one or another of the motors and means responsive to current in the common motor circuit for stepping in each additional motor whenever the current in said circuit reaches and remains for a substantial time interval at a value approximating the full-rated load of the motor or motors then running and for reversely stepping out each additional motor when the current in said circuit falls to and remains for a substantial time interval at a value somewhat above that at which it was stepped in.

WILLIAM DEANS.
HENRY J. KAUFMAN.